United States Patent Office 3,351,627  
Patented Nov. 7, 1967

3,351,627  
PROCESS FOR SYNTHESIS OF VINYL-TETRAZOLE MONOMERS  
Ronald A. Henry, China Lake, Calif., assignor to the United States of America as represented by the Secretary of the Navy  
No Drawing. Filed June 2, 1960, Ser. No. 33,605  
2 Claims. (Cl. 260—308)

The invention described herein may be manufactured and used by or for the Government of the United States of America for governmental purposes without the payment of any royalties thereon or therefor.

The present invention relates to a process for the synthesis of vinyltetrazole monomers.

Older methods of synthesizing vinyltetrazoles, although quite useful for producing material for developmental work in composite propellant research, have a number of disadvantages. The older methods utilize thionyl chloride which requires expensive equipment to prevent the possibility of attack and corrosion as a consequence of highly corrosive gases which are evolved. The older procedures are also long and expensive due to the great number of steps required to synthesize the desired composition and the use of expensive solvents and reagents.

It is therefore an object of this invention to provide a process for synthesizing monomers from which polymers of high nitrogen content can be prepared. Polymers such as those derived from 1- and 2-alkyl-5-vinyltetrazoles are soluble in a variety of solvents, compatible with single and double-base propellant formulations, and are useful as polymeric fuel matrices, and binders for composite propellants and explosives of various types. Illustrative compounds of this process are 1- and 2-alkyl-5-vinyltetrazoles.

The present process effects a considerable saving in cost by employing a newer and simpler process which leads to the simultaneous formation and recovery of both 1- and 2-alkyl-5-vinyltetrazole without appreciable loss of yield.

This new process involves the reaction of β-dialkylaminoproprionitrile with a dialkylammonium azide salt in a suitable solvent, such as dimethylformamide at 100–130° C., preferably 120–125° C., to form a 5-(β-dialkylaminoethyl)tetrazole. The solvent is removed under reduced pressure, the residue is dissolved in water and converted to its sodium salt with an equivalent amount of sodium bicarbonate and alkylated with 1.5–2 equivalents of a dialkylsulfate at 20–50° C., preferably 30–35° C. The pH of the resulting solution is controlled by the addition of sodium carbonate-sodium bicarbonate and the solution boiled for several hours. The aqueous solution after cooling is solvent extracted and the mixture of 1- and 2-alkyl-5-vinyltetrazoles is recovered by evaporating the solvent. The mixture can be separated by fractional distillation. The basis for this new three-step synthesis of 1- and 2-alkyl-5-vinyltetrazole is the elimination of trimethylamine and a proton from 2-(1- and 2-methyl-5-tetrazole) ethyltrimethylammonium hydroxides to form the vinyl derivative. The three-step method is shown as follows:

Overall yields of about 35–40%, respectively, for the 1- and 2-isomers are obtained. The series of reactions can be carried out in one reaction vessel and since the reactions are run in either an essentially neutral solution (first reaction) or in weakly basic buffered solutions (second and third reactions), equipment corrosion is kept at a minimum.

Optimum yields of the vinyltetrazole products are obtained by (a) minimizing the loss of dimethylamine from (2-dimethylamino) propionitrile or from 5-(2-dimethylaminoethyl)tetrazole during the synthesis by use of dimethylammonium azide as the source of the azide ion, (b) using two moles of dimethyl sulfate per mole of tetrazole derivative to insure quaternization of the dimethylaminoethyl group, and, (c) controlling the pH of the solution between 7.0–9.0, preferably 8.0–8.5, during the elimination step, by use of a sodium carbonate-sodium bicarbonate buffer.

The following examples serve to illustrate how the present invention may be carried out in practice, but the invention is not restricted to the following examples.

*Example 1*

Three step synthesis of 1- and 2-methyl-5-vinyltetrazole: A slurry consisting of 196 g. (2.0 moles) of dimethylaminopropionitrile, 144 g. (2.2 moles) of sodium azide, 180 g. (2.2 moles) of dimethylammonium chloride, and 750 ml. of dimethylformamide is agitated and heated at 122–124° C. for 24 hours. As soon as the temperature reaches about 115° C., a vigorous evolution of dimethylamine begins. Amine is trapped in 300 ml. of 95% ethanol cooled in a Dry-Ice-acetone bath. When the heating period is completed, and the solution cooled to 70° C. the dimethylformamide is removed rapidly under reduced pressure (20–30 mm.). In order to obtain 2-methyl-5-vinyltetrazole which is not contaminated with dimethylformamide, it is necessary to remove the latter as completely as possible. This gummy residue of vinyltetrazole is dissolved in 1000 ml. of water to which is added 168 g. (2.0 moles) of sodium bicarbonate and 1 g. of trinitrobenzene (inhibitor). This solution is then methylated at 32–35° C. with 400 ml. of dimethyl sulfate (4.3 moles). External cooling is needed to maintain the temperature. When all the methylating agent is added, the solution is stirred for about 30 minutes at 32–35° C. 84 g. (1.0 mole) of sodium bicarbonate and 53 g. (0.5 mole) of sodium carbonate are added and the solution refluxed for 5 hours. Stirring is needed to prevent bumping and frothing. The mixture is now cooled to 25° C. and filtered to remove the separated salts. The pH of the solution is maintained in the range of 8–8.5. The aqueous phase is extracted with six 250 ml. portions of methylene chloride. The combined extracts are now dried over 40 g. of anhydrous magnesium sulfate and inhibited with 0.5 g. of hydroquinone. The drying agent is removed by filtration and the methylene chloride stripped by distillation at atmospheric pressure; final traces of this solvent are removed by stripping at 20 mm. pressure and room temperature. The mixture of crude vinyl isomers is now separated by distillation at reduced pressure. The 2-methyl-5-vinyltetrazole isomer

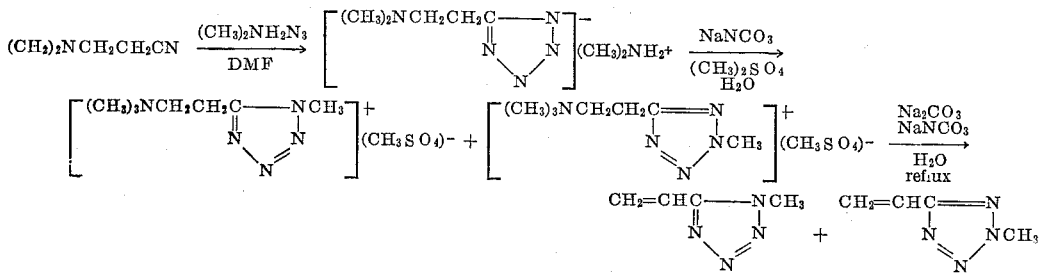

is conveniently and almost completely removed at 1 mm. pressure by heating to a pot temperature of 90° C. A cooled condenser and a receiver chilled in an ice-water bath are needed to prevent loss of the 2-isomer condensate. The weight of the once distilled 2-isomer condensate was 89.9 grams; the index of refraction at 25° C. was 1.4814, corresponding to a purity of 97.2%. The corrected yield amounted to 39.7% of theory. The 1-isomer residue may be purified on a falling-film molecular still operated at a pressure of 2–6 microns and a boiling surface temperature of 120–140° C. The 1-isomer should be distilled as soon as the 2-isomer is removed in order to prevent loss of yield. The weight of the pale yellow 1-isomer, which solidified completely at 5° C., was 77 grams (35.0% of theory).

In another very similar experiment the yields of the 1- and 2-isomers were 35.7 and 43.3%, respectively. Decreasing the amount of dimethyl sulfate from 400 ml. to 300 ml. in an otherwise similar experiment reduced the yields to 30.9 and 33.9%, respectively, for the 1- and 2-isomers.

*Example II*

The three-step synthesis of 1- and 2-methyl-5-vinyltetrazole: A slurry of 196 g. (2.0 moles) of dimethylaminopropionitrile hydrochloride, 44 g. (2.2 moles) of sodium azide and 750 ml. of dimethylformamide are heated at a temperature of 122–124° C. for 24 hours. The balance of the process including product recovery proceeds as in Example I except that the boiling of the aqueous solution is for about 6½ hours. The yield of distilled 2-methyl-5-vinyltetrazole was 49.7 g. (22.6% of theory), that of distilled 1-isomer 54.8 g. (24.9% of theory).

In Example II, above described, if 1.5 moles of dimethyl sulfate are employed per mole of starting propionitrile derivative instead of 2.0 moles, the yields of distilled isomers are about the same.

In similar instances in which the initial reaction of dimethylaminopropionitrile hydrochloride as set out in Example II, is performed at 110–112° C., the amount of dimethylamine evolved is reduced. The yields of 1- and 2-methyl-5-vinyltetrazole were 23.0 and 26.5%, respectively, after a 4 hour boiling of the aqueous solution. By adding more sodium carbonate to the aqueous mother liquor and boiling for 4 hours, additional 1- and 2-isomers are produced.

Many modifications and variations of the present process are possible in the light of the above teachings. Other alkalis besides sodium bicarbonate can be used to make the salt prior to the alkylation step; also the decomposition step in boiling water can be effected with other bases besides those listed provided the pH is carefully controlled in the range of 7.0–9.0, preferably 8.0–8.5.

What is claimed is:

1. The process for synthesizing 1-and 2-methyl-5-vinyltetrazoles which comprises reacting for periods up to 24 hours at a temperature from about 120–125° C. dimethylaminopropionitrile, sodium azide and dimethylammonium chloride in a solvent of dimethylformamide, methylating the product thereof with dimethyl sulfate, and refluxing the methylated products for up to 5 hours in an aqueous base solution.

2. The process of claim 1 in which the pH of the aqueous solution is kept within the 7.0–9.0 range.

References Cited

UNITED STATES PATENTS 3,055,911   9/1962   Finnegan et al. _____ 260—308.4

ALTON D. ROLLINS, *Primary Examiner.*

L. D. ROSDOL, *Examiner.*

J. W. WHISLER, *Assistant Examiner.*